US008594220B2

(12) United States Patent
Bayesteh et al.

(10) Patent No.: US 8,594,220 B2
(45) Date of Patent: Nov. 26, 2013

(54) CODE BOOKS FOR MULTIPLE-INPUT AND MULTIPLE-OUTPUT COMMUNICATION SYSTEMS

(75) Inventors: Alireza Bayesteh, Kitchener (CA); Farzaneh Kohandani, Kitchener (CA); Yongkang Jia, Ottawa (CA)

(73) Assignee: Research In Motion Limited (CA)

( * ) Notice: Subject to any disclaimer, the term of this patent is extended or adjusted under 35 U.S.C. 154(b) by 916 days.

(21) Appl. No.: 12/702,365

(22) Filed: Feb. 9, 2010

(65) Prior Publication Data

US 2010/0322341 A1 Dec. 23, 2010

Related U.S. Application Data

(60) Provisional application No. 61/219,342, filed on Jun. 22, 2009.

(51) Int. Cl.
*H04B 7/02* (2006.01)

(52) U.S. Cl.
USPC ........... 375/267; 375/260; 375/295; 375/299; 375/340; 375/347; 455/101; 455/132; 455/500; 455/562.1; 370/334; 370/464; 370/480; 341/173; 341/180

(58) Field of Classification Search
USPC ................ 375/260, 267, 295, 299, 340, 347; 455/101, 132, 500, 562.1; 370/334, 370/464, 480; 341/173, 180
See application file for complete search history.

(56) References Cited

U.S. PATENT DOCUMENTS

| | | | | |
|---|---|---|---|---|
| 7,630,886 | B2 * | 12/2009 | Zhang et al. ................ | 704/222 |
| 7,746,936 | B2 * | 6/2010 | Kwon et al. ................ | 375/242 |
| 7,813,458 | B2 * | 10/2010 | van Waes et al. ............ | 375/347 |
| 8,121,235 | B1 * | 2/2012 | Sun et al. .................... | 375/347 |
| 8,238,461 | B2 * | 8/2012 | Zhou et al. .................. | 375/267 |
| 8,259,824 | B2 * | 9/2012 | Varadarajan et al. ........ | 375/260 |
| 8,325,839 | B2 * | 12/2012 | Rensburg et al. ............ | 375/267 |
| 2006/0161432 | A1 | 7/2006 | Zhang et al. | |
| 2008/0080449 | A1 | 4/2008 | Huang et al. | |
| 2008/0081669 | A1 | 4/2008 | Kwon et al. | |
| 2008/0225962 | A1 | 9/2008 | Zhou et al. | |

OTHER PUBLICATIONS

International Preliminary Report on Patentability for PCT Application No. PCT/CA2010/000141, mailed Jan. 4, 2012.
3GPP TS 36.211 V8.5.0, 3rd Generation Partnership Project; Technical Specification Group Radio Access Network; Evolved Universal Terrestrial Radio Access (E-UTRA); Physical Channels and Modulation (Release 8), (Dec. 2008), pp. 1-82.
3GPP TS 36.211 V8.7.0, 3rd Generation Partnership Project; Technical Specification Group Radio Access Network; Evolved Universal Terrestrial Radio Access (E-UTRA); Physical Channels and Modulation (Release 8), (May 2009), pp. 1-83.

(Continued)

*Primary Examiner* — Leon Flores
(74) *Attorney, Agent, or Firm* — Cantor Colburn LLP

(57) ABSTRACT

A method and device for transmitting and receiving data. A device comprises a code book and a transmitter. The code book comprises a plurality of codewords, wherein the plurality of codewords correspond to a plurality of vectors having a largest minimum chordal distance with respect to the plurality of vectors. The transmitter is configured to send a number of wireless signals using the code book. A receiver receives and decodes the number of wireless signals.

30 Claims, 10 Drawing Sheets

(56) References Cited

OTHER PUBLICATIONS

3GPP TR 36.814, VO.4.1, 3rd Generation Partnership Project; Technical Specification Group Radio Access Network; "Further Advancements for E-UTRA, Physical Layer Aspects", (Release 9), (Feb. 2009), pp. 1-31.

3GPP TSG RAN WG1, Meeting #57bis, Los Angeles, USA, Jun. 29-Jul. 3, 2009, Draft Report of 3GPP TSG RAN WG1 #57 VO.3.0 (San Fransicso, USA, May 4-8, 2009), pp. 1-70.

3GPP TSG RAN WG1 Meeting #57, San Francisco, USA, May 4-8, 2009, R1-091818, Huawei, "Cubic Metric Friendly Precoding for UL 4Tx MIMO", pp. 1-8.

3GPP TSG RAN WG1 LTE Adhoc, Helsinki, Finland, Jan. 23-26, 2006, R1-060023, Motorola, "Cubic Metric in 3GPP-LTE", pp. 1-7.

Love et al., "Grassmannian Beamforming for Multiple-Input Multiple-Output Wireless Systems", IEEE Trans. on Inform. Theory, vol. 49, Oct. 2003, pp. 1-13.

PCT International Search Report, Application No. PCT/CA2010/000141, dated Apr. 9, 2010.

Partial European Search Report, Application No. 10153108.5, dated May 18, 2010.

Extended European Search Report for EP Application No. 10153108.5, dated Sep. 6, 2010.

* cited by examiner

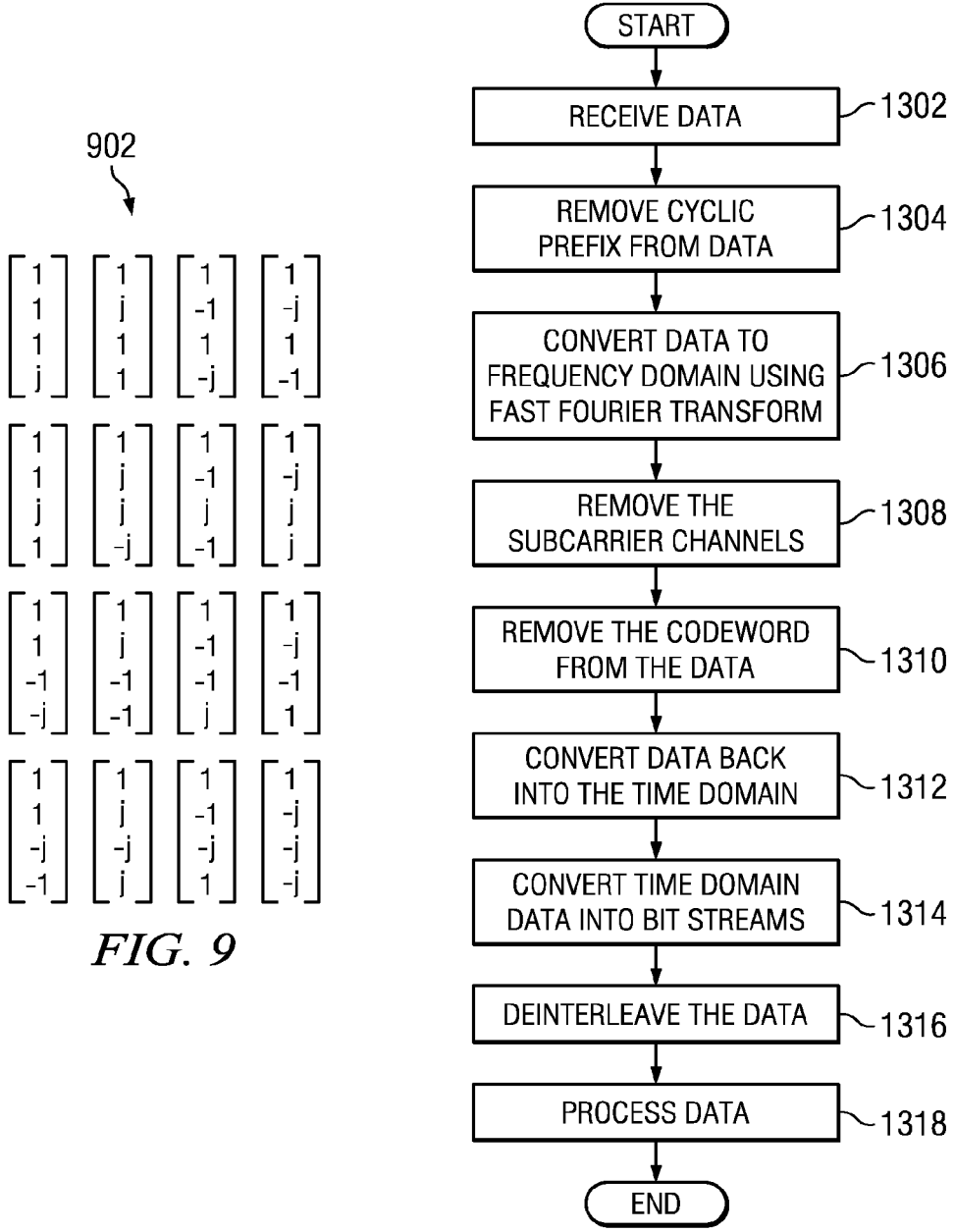

US 8,594,220 B2

CODE BOOKS FOR MULTIPLE-INPUT AND MULTIPLE-OUTPUT COMMUNICATION SYSTEMS

This non-provisional patent application claims the benefit of priority of the filing date of U.S. Provisional Patent Application Ser. No. 61/219,342, filed Jun. 22, 2009, the entire contents of which application are incorporated herein by reference.

TECHNICAL FIELD

The present disclosure relates generally to a communication system and, in particular, to a method and apparatus for a multiple-input and multiple-output communication system. Still, more particularly, the present disclosure relates to a method and apparatus for a code book for use in transmitting information in a multiple-input and multiple-output communication system.

BACKGROUND

A multiple-input and multiple-output (MIMO) communication system is a communication system that is capable of transmitting and receiving data between end user equipment and network equipment using multiple antennas in both the end user equipment and the network equipment. The network equipment and the end user equipment both have multiple antennas. The use of multiple antennas may improve the efficiency in transferring information between the end user equipment and the network equipment. A multiple-input and multiple-output communication system is capable of transmitting information between the network equipment and the end user equipment using the antennas.

The transmission rate of information may be improved by a special division multiple access scheme. This type of scheme may allocate spatial beams to the end user equipment for transmitting data to the network equipment using the spatial beams. The allocation of these beams may be referred to as precoding. Precoding is performed using a matrix, which may be referred to as a codeword. A code book containing multiple codewords is present in the end user equipment.

This precoding process may involve the network equipment being aware of the properties of the communication channel used with the user equipment. The network equipment may send information or instructions to the user equipment for the selection of a particular codeword in the code book for use in transmitting information.

Generating code books that increase performance may be challenging when sending information from end user equipment to network equipment. The size of code books may be limited, depending on the user equipment. Further, the complexity of code books may reduce performance.

Therefore, it would be advantageous to have a method and apparatus that takes into account at least some of the issues discussed above, as well as possibly other issues.

BRIEF DESCRIPTION OF THE DRAWINGS

For a better understanding of the various embodiments described herein and to show more clearly how they may be carried into effect, reference will now be made, by way of example only, to the accompanying drawings which show at least one exemplary embodiment and in which:

FIG. 9 is a diagram of a set of vectors in accordance with an illustrative embodiment;

FIG. 13 is a flowchart of a process for receiving a signal from user equipment in accordance with an illustrative embodiment.

DETAILED DESCRIPTION

Figure 1:
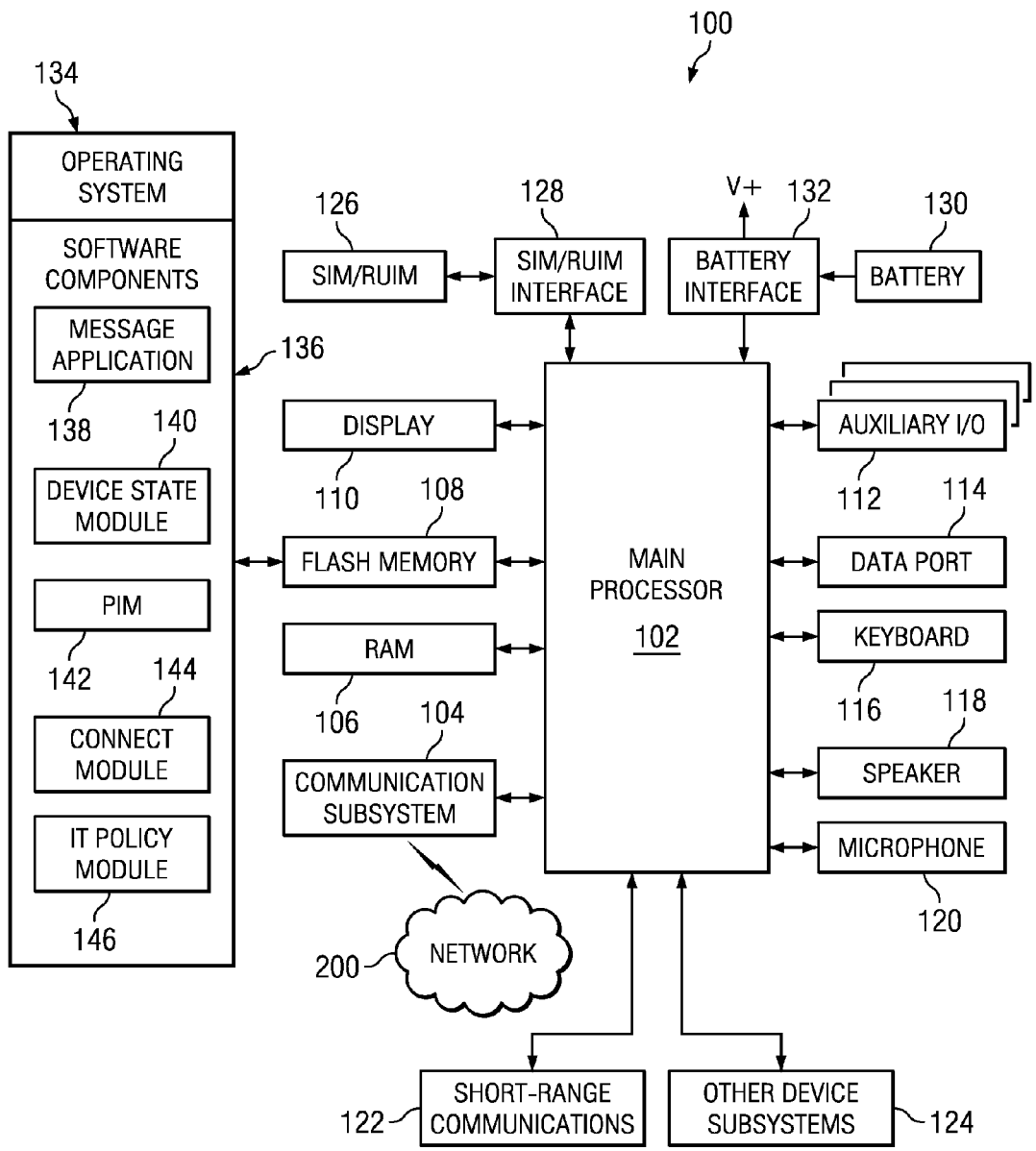
FIG. 1 is a block diagram of an embodiment of a user equipment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The embodiments described herein generally relate to a mobile wireless communication device, hereafter referred to as user equipment, which can be configured according to an IT policy. It should be noted that the term IT policy, in general, refers to a collection of IT policy rules, in which the IT policy rules can be defined as being either grouped or non-grouped and global or per-user. The terms grouped, non-grouped, global and per-user are defined further below. Examples of applicable communication devices include pagers, cellular phones, cellular smart-phones, wireless organizers, personal digital assistants, computers, laptops, handheld wireless communication devices, wirelessly enabled notebook computers and the like.

The user equipment is a two-way communication device with advanced data communication capabilities including the capability to communicate with other user equipments or computer systems through a network of transceiver stations. The user equipment may also have the capability to allow voice communication. Depending on the functionality provided by the user equipment, it may be referred to as a data messaging device, a two-way pager, a cellular telephone with data messaging capabilities, a wireless Internet appliance, or a data communication device (with or without telephony capabilities). To aid the reader in understanding the structure of the user equipment and how it communicates with other devices and host systems, reference will now be made to FIGS. 1 through 4.

Referring first to FIG. 1, shown therein is a block diagram of an exemplary embodiment of user equipment 100. User equipment 100 includes a number of components such as a main processor 102 that controls the overall operation of user equipment 100. Communication functions, including data and voice communications, are performed through a communication subsystem 104. The communication subsystem 104 receives messages from and sends messages to a wireless network 200. In this illustrative embodiment of user equipment 100, communication subsystem 104 is configured in accordance with the Global System for Mobile Communication (GSM) and General Packet Radio Services (GPRS) standards. The GSM/GPRS wireless network is used worldwide and these standards may be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with user equipment 100 is a GSM/GPRS wireless network in one implementation, other wireless networks may also be associated with user equipment 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122, and other device subsystems 124.

Some of the subsystems of the user equipment 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The user equipment 100 can send and receive communication signals over the wireless network 200 after required network registration or activation procedures have been completed. Network access is associated with a subscriber or user of the user equipment 100. To identify a subscriber, the user equipment 100 requires a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the user equipment 100 and to personalize the user equipment 100, among other things. Without the SIM card 126, the user equipment 100 is not fully operational for communication with the wireless network 200. By inserting the SIM card/RUIM 126 into the SIM/RUIM interface 128, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 can include some user parameters such as an International Mobile Subscriber Identity (IMSI). An advantage of using the SIM card/RUIM 126 is that a subscriber is not necessarily bound by any single physical user equipment. The SIM card/RUIM 126 may store additional subscriber information for user equipment as well, including datebook (or calendar) information and recent call information. Alternatively, user identification information can also be programmed into the flash memory 108.

The user equipment 100 is a battery-powered device and includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the user equipment 100. Although current technology makes use of a battery, future technologies such as micro fuel cells may provide the power to the user equipment 100.

The user equipment 100 also includes an operating system 134 and software components 136 which are described in more detail below. The operating system 134 and the software components 136 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 such as specific device applications, or parts thereof, may be temporarily loaded into a volatile store such as the RAM 106. Other software components can also be included, as is well known to those skilled in the art.

The subset of software components 136 that control basic device operations, including data and voice communication applications, will normally be installed on the user equipment 100 during its manufacture. Other software applications include a message application 138 that can be any suitable software program that allows a user of the user equipment 100 to send and receive electronic messages. Various alternatives exist for the message application 138 as is well known to those skilled in the art. Messages that have been sent or received by the user are typically stored in the flash memory 108 of the user equipment 100 or some other suitable storage element in the user equipment 100. In at least some embodiments, some of the sent and received messages may be stored remotely from the device 100 such as in a data store of an associated host system that the user equipment 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the user equipment 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. PIM data items may be seamlessly integrated, synchronized, and updated via the wireless network 200 with the user equipment subscriber's corresponding data items stored or associated with a host computer system. This functionality creates a mirrored host computer on the user equipment 100 with respect to such items. This can be particularly advantageous when the host computer system is the user equipment subscriber's office computer system.

The user equipment 100 also includes a connect module 144, and an IT policy module 146. The connect module 144 implements the communication protocols that are required for the user equipment 100 to communicate with the wireless infrastructure and any host system, such as an enterprise system, that the user equipment 100 is authorized to interface with. Examples of a wireless infrastructure and an enterprise system are given in FIGS. 3 and 4, which are described in more detail below.

The connect module 144 includes a set of APIs that can be integrated with the user equipment 100 to allow the user equipment 100 to use any number of services associated with the enterprise system. The connect module 144 allows the user equipment 100 to establish an end-to-end secure, authenticated communication pipe with the host system. A subset of applications for which access is provided by the connect module 144 can be used to pass IT policy commands from the host system to the user equipment 100. This can be done in a wireless or wired manner. These instructions can then be passed to the IT policy module 146 to modify the configuration of the device 100. Alternatively, in some cases, the IT policy update can also be done over a wired connection.

The IT policy module 146 receives IT policy data that encodes the IT policy. The IT policy module 146 then ensures that the IT policy data is authenticated by the user equipment 100. The IT policy data can then be stored in the flash memory 108 in its native form. After the IT policy data is stored, a global notification can be sent by the IT policy module 146 to all of the applications residing on the user equipment 100. Applications for which the IT policy may be applicable then respond by reading the IT policy data to look for IT policy rules that are applicable.

The IT policy module 146 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some embodiments, the IT policy module 146 can determine which applications are affected by the IT policy data and send a notification to only those applications. In either of these cases, for applications that aren't running at the time of the notification, the applications can call the parser or the IT policy module 146 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore, the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 146 sends an acknowledgement back to the host system to indicate that the IT policy data was received and successfully applied.

Other types of software applications can also be installed on the user equipment 100. These software applications can be third party applications, which are added after the manufacture of the user equipment 100. Examples of third party applications include games, calculators, utilities, etc.

The additional applications can be loaded onto the user equipment 100 through at least one of the wireless network 200, the auxiliary I/O subsystem 112, the data port 114, the short-range communications subsystem 122, or any other suitable device subsystem 124. This flexibility in application installation increases the functionality of the user equipment 100 and may provide enhanced on-device functions, communication-related functions, or both. For example, secure communication applications may enable electronic commerce functions and other such financial transactions to be performed using the user equipment 100.

The data port 114 enables a subscriber to set preferences through an external device or software application and extends the capabilities of the user equipment 100 by providing for information or software downloads to the user equipment 100 other than through a wireless communication network. The alternate download path may, for example, be used to load an encryption key onto the user equipment 100 through a direct, and thus reliable and trusted connection, to provide secure device communication.

The data port 114 can be any suitable port that enables data communication between the user equipment 100 and another computing device. The data port 114 can be a serial or a parallel port. In some instances, the data port 114 can be a USB port that includes data lines for data transfer and a supply line that can provide a charging current to charge the battery 130 of the user equipment 100.

The short-range communications subsystem 122 provides for communication between the user equipment 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 is preferably an alphanumeric keyboard or telephone-type keypad. However, other types of keyboards may also be used. A composed item may be transmitted over the wireless network 200 through the communication subsystem 104.

For voice communications, the overall operation of the user equipment 100 is substantially similar, except that the received signals are output to the speaker 118, and signals for transmission are generated by the microphone 120. Alternative voice or audio I/O subsystems, such as a voice message recording subsystem, can also be implemented on the user equipment 100. Although voice or audio signal output is accomplished primarily through the speaker 118, the display 110 can also be used to provide additional information such as the identity of a calling party, duration of a voice call, or other voice call related information.

Figure 2:
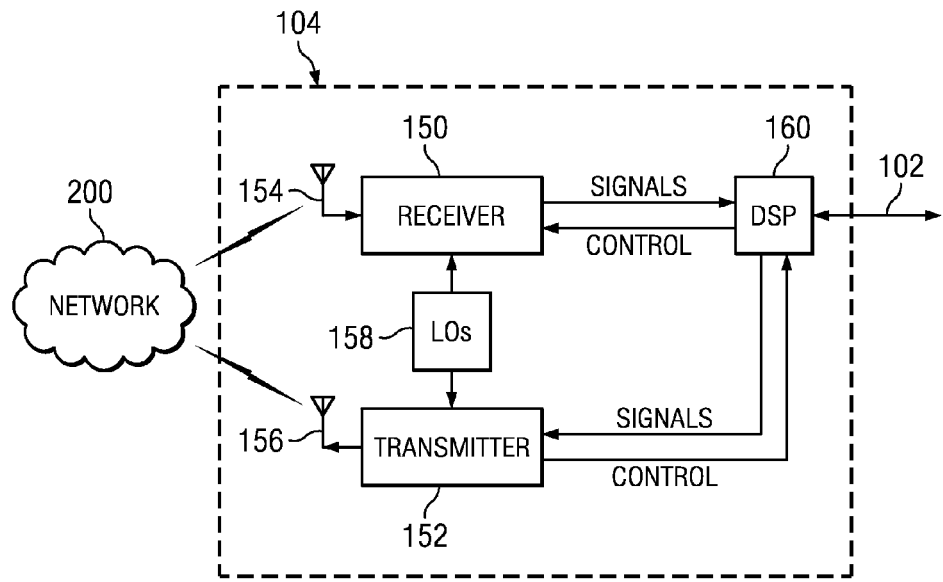
FIG. 2 is a block diagram of an embodiment of a communication subsystem component of the user equipment in FIG. 1.

Referring now to FIG. 2, a block diagram of the communication subsystem component 104 is shown. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the user equipment 100 is intended to operate. Thus, it should be understood that the design illustrated in FIG. 2 serves only as one example.

Signals received by the antenna 154 through the wireless network 200 are input to the receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 may be adaptively controlled through automatic gain control algorithms implemented in the DSP 160.

The wireless link between the user equipment 100 and the wireless network 200 can contain one or more different channels, typically different RF channels, and associated protocols used between the user equipment 100 and the wireless network 200. An RF channel is a limited resource that must be conserved, typically due to limits in overall bandwidth and limited battery power of the user equipment 100.

When the user equipment 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

Figure 3:
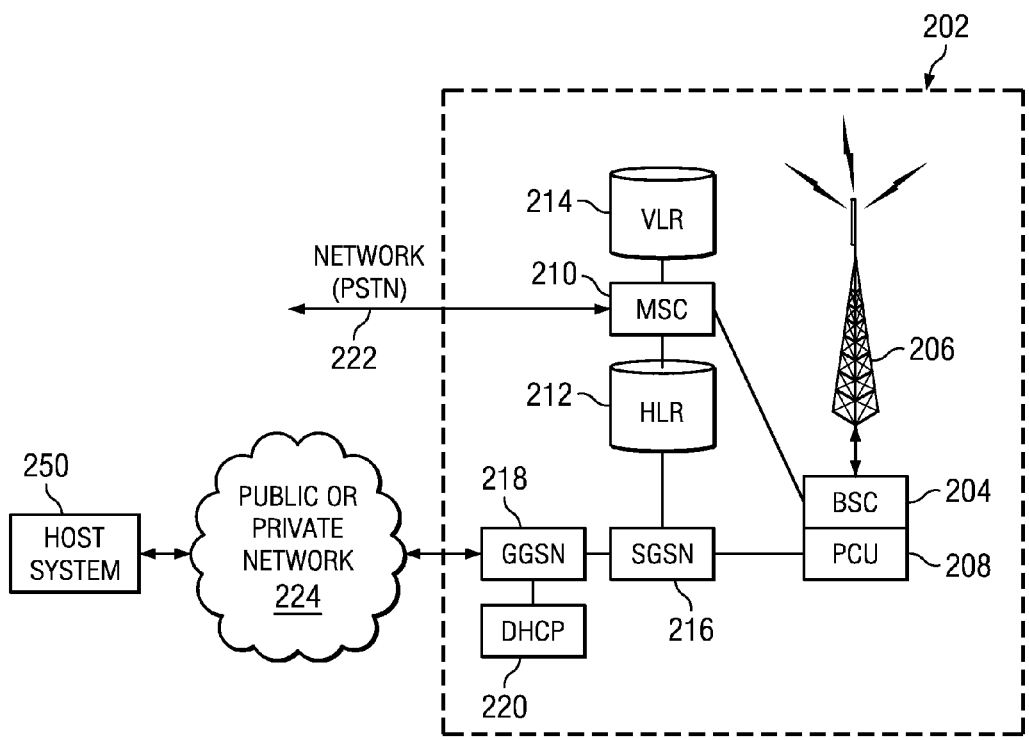
FIG. 3 is a block diagram of a node of a wireless network.

Referring now to FIG. 3, a block diagram of an illustrative implementation of a node 202 of the wireless network 200 is shown. In practice, the wireless network 200 comprises one or more nodes 202. In conjunction with the connect module 144, the user equipment 100 can communicate with the node 202 within the wireless network 200. In the illustrative implementation in FIG. 3, the node 202 is configured in accordance with General Packet Radio Service (GPRS) and Global Systems for Mobile (GSM) technologies. However, in other embodiments, node 202 may be configured in accordance with Long Term Evolution (LTE) technology. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable user equipments. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the user equipment 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to, and receives communication signals from, user equipments within its cell via the station 206. The fixed transceiver equipment normally performs such functions as modulation and possibly encoding or encryption of signals to be transmitted to the user equipment 100 in accordance with particular, usually predetermined, communication protocols and parameters, under control of its controller. The fixed transceiver equipment similarly demodulates and possibly decodes and decrypts, if necessary, any communication signals received from the user equipment 100 within its cell. Communication protocols and parameters may vary between different nodes. For example, one node may employ a different modulation scheme and operate at different frequencies than other nodes.

For all user equipments 100 registered with a specific network, permanent configuration data such as a user profile is stored in the HLR 212. The HLR 212 also contains location information for each registered user equipment and can be queried to determine the current location of a user equipment. The MSC 210 is responsible for a group of location areas and stores the data of the user equipments currently in its area of responsibility in the VLR 214. Further, the VLR 214 also contains information on user equipments that are visiting other networks. The information in the VLR 214 includes part of the permanent user equipment data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely, packet switched data support, within GSM. The SGSN 216 and the MSC 210 have similar responsibilities within the wireless network 200 by keeping track of the location of each user equipment 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given user equipment 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a user equipment 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each user equipment 100 must be assigned to one or more APNs and user equipments 100 cannot exchange data without first performing a GPRS Attach to an APN that it has been authorized to use. The APN may be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a user equipment 100 is not using its PDP Context, the PDP Context can be de-allocated and the IP address returned to the IP address pool managed by the DHCP server 220.

Figure 4:
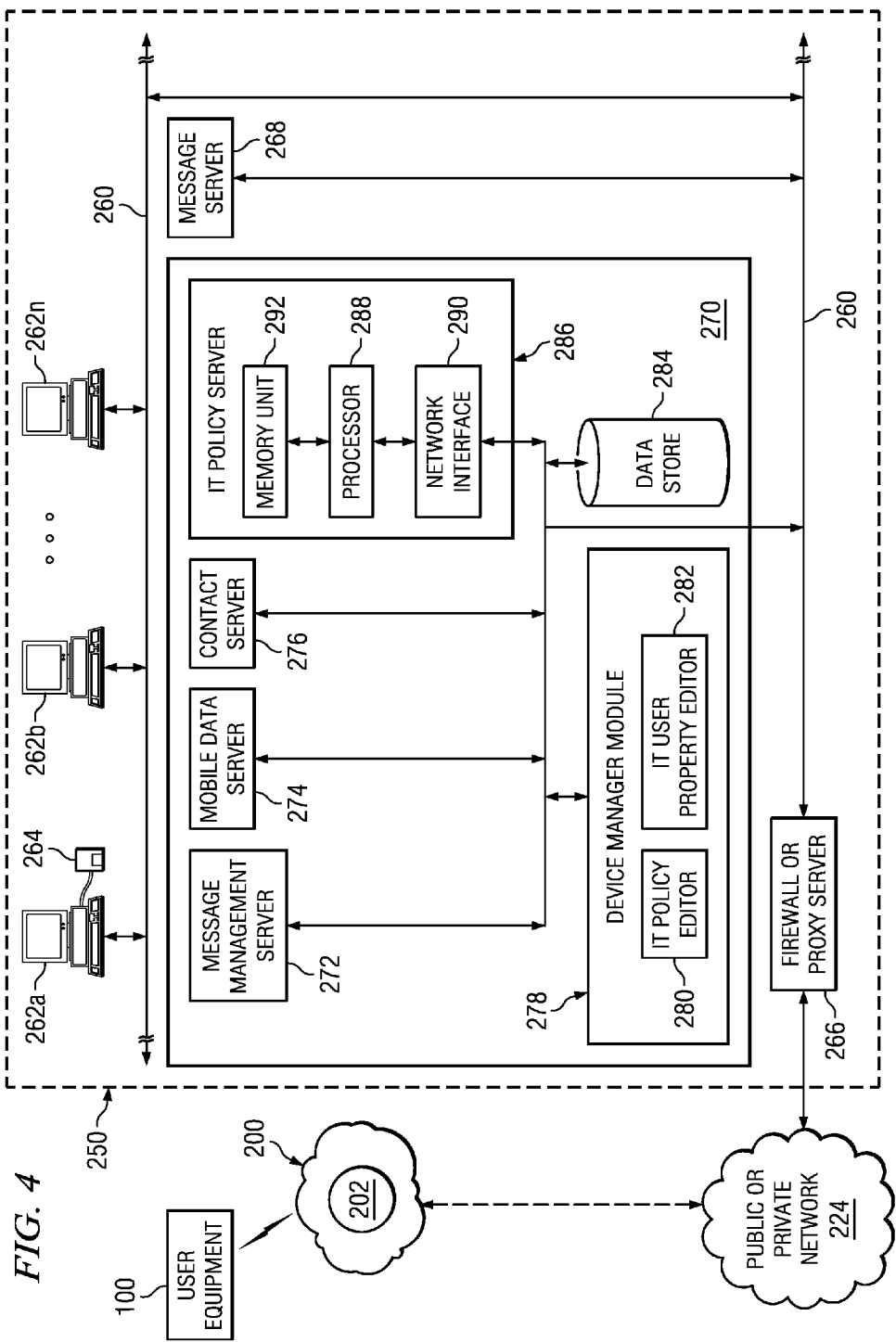
FIG. 4 is a block diagram illustrating components of a host system in one configuration for use with the wireless network in FIG. 3 and the user equipment in FIG. 1.

Referring now to FIG. 4, shown therein is a block diagram illustrating components of an illustrative configuration of a host system 250 that the user equipment 100 can communicate with in conjunction with the connect module 144. The host system 250 will typically be a corporate enterprise or other local area network (LAN), but may also be a home office computer or some other private system, for example, in variant implementations. In this example shown in FIG. 4, the host system 250 is depicted as a LAN of an organization to which a user of the user equipment 100 belongs. Typically, a plurality of user equipment can communicate wirelessly with the host system 250 through one or more nodes 202 of the wireless network 200.

The host system 250 comprises a number of network components connected to each other by a network 260. As used herein a number when referring to items, means one or more items. For example, a number of components is one or more components. In this illustrative example, a user's desktop computer 262*a* with an accompanying cradle 264 for the user's user equipment 100 is situated on a LAN connection. The cradle 264 for the user equipment 100 can be coupled to the computer 262*a* by a serial or a Universal Serial Bus (USB) connection, for example. Other user computers 262*b*-262*n* are also situated on the network 260, and each may or may not be equipped with an accompanying cradle 264. The cradle 264 facilitates the loading of information (e.g. PIM data, private symmetric encryption keys to facilitate secure communications) from the user computer 262*a* to the user equipment 100, and may be particularly useful for bulk information updates often performed in initializing the user equipment 100 for use. The information downloaded to the user equipment 100 may include certificates used in the exchange of messages.

It will be understood by persons skilled in the art that the user computers 262*a*-262*n* will typically also be connected to other peripheral devices, such as printers, etc., which are not explicitly shown in FIG. 4. Furthermore, only a subset of network components of the host system 250 are shown in FIG. 4 for ease of exposition, and it will be understood by persons skilled in the art that the host system 250 will comprise additional components that are not explicitly shown in FIG. 4 for this illustrative configuration. More generally, the host system 250 may represent a smaller part of a larger network (not shown) of the organization, and may comprise different components or be arranged in different topologies than that shown in the illustrative embodiment in FIG. 4.

To facilitate the operation of the user equipment 100 and the wireless communication of messages and message-related data between the user equipment 100 and components of the host system 250, a number of wireless communication support components 270 can be provided. In some implementations, the wireless communication support components 270 can include a message management server 272, a mobile data server 274, a contact server 276, and a device manager module 278. The device manager module 278 includes an IT Policy editor 280 and an IT user property editor 282, as well as other software components for allowing an IT administrator to configure the user equipment 100. In an alternative embodiment, there may be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the user equipment 100. The memory unit 292 can store functions used in implementing the IT policy as well as related data. Those skilled in the art know how to implement these various components. Other components may also be included as is well known to those skilled in the art. Further, in some implementations, the data store 284 can be part of any one of the servers.

In this illustrative embodiment, the user equipment 100 communicates with the host system 250 through node 202 of the wireless network 200 and a Public or Private Network 224 such as a service provider network or the public Internet. Access to the host system 250 may be provided through one or more routers (not shown), and computing devices of the host system 250 may operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the user equipment 100. The wireless VPN router allows a VPN connection to be established directly through a specific wireless network to the user equipment 100. The wireless VPN router can be used with the Internet Protocol (IP) Version 6 (IPV6) and IP-based wireless networks. This protocol can provide enough IP addresses so that each user equipment has a dedicated IP address, making it possible to push information to a user equipment at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the user equipment 100 in this alternative implementation.

Messages intended for a user of the user equipment 100 are initially received by a message server 268 of the host system 250. Such messages may originate from any number of sources. For instance, a message may have been sent by a sender from the computer 262b within the host system 250, from a different user equipment (not shown) connected to the wireless network 200 or a different wireless network, or from a different computing device, or other device capable of sending messages, via the Public or Private Network 224, possibly through an application service provider (ASP) or Internet service provider (ISP), for example.

The message server 268 typically acts as the primary interface for the exchange of messages, particularly e-mail messages, within the organization and over the Public or Private Network 224. Each user in the organization that has been set up to send and receive messages is typically associated with a user account managed by the message server 268. Some illustrative implementations of the message server 268 include a Microsoft Exchange™ server, a Lotus Domino™ server, a Novell Groupwise™ server, or another suitable mail server installed in a corporate environment. In some implementations, the host system 250 may comprise multiple message servers 268. The message server 268 may also be adapted to provide additional functions beyond message management, including the management of data associated with calendars and task lists, for example.

When messages are received by the message server 268, they are typically stored in a data store associated with the message server 268. In at least some embodiments, the data store may be a separate hardware unit, such as data store 284, that the message server 268 communicates with. Messages can be subsequently retrieved and delivered to users by accessing the message server 268. For instance, an e-mail client application operating on a user's computer 262a may request the e-mail messages associated with that user's account stored on the data store associated with the message server 268. These messages are then retrieved from the data store and stored locally on the computer 262a. The data store associated with the message server 268 can store copies of each message that is locally stored on the user equipment 100. Alternatively, the data store associated with the message server 268 can store all of the messages for the user of the user equipment 100 and only a smaller number of messages can be stored on the user equipment 100 to conserve memory. For instance, the most recent messages (i.e. those received in the past two to three months for example) can be stored on the user equipment 100.

When operating the user equipment 100, the user may wish to have e-mail messages retrieved for delivery to the user equipment 100. The message application 138 operating on the user equipment 100 may also request messages associated with the user's account from the message server 268. The message application 138 may be configured (either by the user or by an administrator, possibly in accordance with an organization's information technology (IT) policy) to make this request at the direction of the user, at some pre-defined time interval, or upon the occurrence of some pre-defined event. In some implementations, the user equipment 100 is assigned its own e-mail address, and messages addressed specifically to the user equipment 100 are automatically redirected to the user equipment 100 as they are received by the message server 268.

The message management server 272 can be used to specifically provide support for the management of messages, such as e-mail messages, that are to be handled by user equipment. Generally, while messages are still stored on the message server 268, the message management server 272 can be used to control when, if, and how messages are sent to the user equipment 100. The message management server 272 also facilitates the handling of messages composed on the user equipment 100, which are sent to the message server 268 for subsequent delivery.

For example, the message management server 272 may monitor the user's "mailbox" (e.g. the message store associated with the user's account on the message server 268) for new e-mail messages, and apply user-definable filters to new messages to determine if and how the messages are relayed to the user's user equipment 100. The message management server 272 may also compress and encrypt new messages (e.g. using an encryption technique such as Data Encryption Standard (DES), Triple DES, or Advanced Encryption Standard (AES)) and push them to the user equipment 100 via the Public or Private Network 224 and the wireless network 200. The message management server 272 may also receive messages composed on the user equipment 100 (e.g. encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from, or received by, the user equipment 100 can be defined (e.g. by an administrator in accordance with IT policy) and enforced by the message management server 272. These may include whether the user equipment 100 may receive encrypted or signed messages, minimum encryption key sizes, whether outgoing messages must be encrypted or signed, and whether copies of all secure messages sent from the user equipment 100 are to be sent to a pre-defined copy address, for example.

The message management server 272 may also be adapted to provide other control functions, such as only pushing certain message information or pre-defined portions (e.g. "blocks") of a message stored on the message server 268 to the user equipment 100. For example, in some cases, when a message is initially retrieved by the user equipment 100 from the message server 268, the message management server 272 may push only the first part of a message to the user equipment 100, with the part being of a pre-defined size (e.g. 2 KB). The user can then request that more of the message be delivered in similar-sized blocks by the message management server 272 to the user equipment 100, possibly up to a maximum pre-defined message size. Accordingly, the message management server 272 facilitates better control over the type of data and the amount of data that is communicated to the user equipment 100, and can help to minimize potential waste of bandwidth or other resources.

The mobile data server 274 encompasses any other server that stores information that is relevant to the corporation. The mobile data server 274 may include, but is not limited to, databases, online data document repositories, customer relationship management (CRM) systems, or enterprise resource planning (ERP) applications.

The contact server 276 can provide information for a list of contacts for the user in a similar fashion as the address book on the user equipment 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the message management server 272, the mobile data server 274, the contact server 276, the device manager module 278, the data store 284 and the IT policy server 286 do not need to be implemented on separate physical servers within the host system 250. For example, some or all of the functions associated with the message management server 272 may be integrated with the message server 268 or some other server in the host system 250. Alternatively, the host system 250 may comprise multiple message management servers 272, particularly in variant implementations where a large number of user equipment need to be supported.

Alternatively, in some embodiments, the IT policy server 286 can provide the IT policy editor 280, the IT user property editor 282 and the data store 284. In some cases, the IT policy server 286 can also provide the device manager module 278. The processor 288 of the IT policy server 286 can be used to perform the various steps of a method for providing IT policy data that is customizable on a per-user basis as explained further below and in conjunction with FIGS. 5 to 8. The processor 288 can execute the editors 280 and 282. In some cases, the functionality of the editors 280 and 282 can be provided by a single editor. In some cases, the memory unit 292 can provide the data store 284.

The device manager module 278 provides an IT administrator with a graphical user interface with which the IT administrator interacts to configure various settings for the user equipments 100. As mentioned, the IT administrator can use IT policy rules to define behaviors of certain applications on the user equipment 100 that are permitted such as phone, web browser or Instant Messenger use. The IT policy rules can also be used to set specific values for configuration settings that an organization requires on the user equipment 100 such as auto signature text, WLAN/VoIP/VPN configuration, security requirements (e.g. encryption algorithms, password rules, etc.), specifying themes or applications that are allowed to run on the user equipment 100, and the like.

The illustration of hardware components in FIGS. 1-4 are not meant to imply physical or architectural limitations to the manner in which different illustrative embodiments may be implemented. Other components in addition to, or in place of, the ones illustrated may be used. Some components may be unnecessary in some illustrative embodiments. Also, the blocks are presented to illustrate some functional components. One or more of these blocks may be combined or divided into different blocks when implemented in different illustrative embodiments.

For example, one or more of the different illustrative embodiments may be applied to other types of communication standards other than those described above with respect to FIGS. 1-4. For example, without limitation, the different illustrative embodiments may be implemented using LTE Advanced. Additionally, the wireless networks illustrated may take the form of or include 4G networks.

The different illustrative embodiments recognize and take into account a number of considerations. For example, the different illustrative embodiments recognize that precoding is often used in multiple-input and multiple-output communication systems with limited feedback. Precoding may be considered an example of beam forming to support transmission of information within the multiple-input and multiple-output communication systems. Precoding allows for multiple streams of signals emitted from multiple transmit antennas to be given independent and appropriate weighting for each data stream in a manner that is intended to increase the throughput at the receiver.

When using a precoding matrix defined as F, the output of a multiple-input and multiple-output communication system may be written as follows:

$$y=HFs+v,$$

H is the $M_r \times M_t$ complex Gaussian channel matrix. F is the precoding matrix of $M_r \times M$ where $M<\min(M_r,M_t)$. The input signal vector is "s", which is a M×1 matrix, and "v" is the noise vector. If minimum mean squared error (MMSE) criterion is selected, with the assumption of limited feedback, these code books have to be designed from a complex Grassmannian space where the chordal distance between any two codewords $F_1$ and $F_2$ is defined as:

$$d(F_1, F_2) = \frac{1}{\sqrt{2}} \|F_1 F_1^* - F_2 F_2^*\|_F,$$

F denotes the Frobenius form. The Grassmannian space Gr(n,k) is the set of k-dimensional subspaces in an n-dimensional vector space. The minimum chordal distance has to be maximized for minimization of the mean squared error.

The different illustrative embodiments recognize and take into account that with a rank 3 transmission, designing a code book to increase the efficiency of information transmission as compared to current designs is desirable. The different illustrative embodiments recognize and take into account that the minimum chordal distance between any two M-dimensional subspaces of the N-dimensional space (N>M) is the same as the minimum chordal distance between the corresponding (N−M) dimensional null spaces. In the illustrative example, a rank 3 code book used for precoding may be determined by a set of 4×3 matrices with orthonormal columns. These matrices generate a three-dimensional subspace in the four-dimensional space.

As a result, maximizing the minimum chordal distance between these three-dimensional subspaces is equivalent to maximizing the minimum chordal distance between the corresponding one-dimensional null space of the subspaces.

Thus, one or more of the illustrative embodiments finds a set of 4×1 vectors with the maximum minimum chordal distance. In some illustrative examples, the elements of the vectors may be selected from a set $\{1, -1, j, -j\}$. In this illustrative example, the set has 64 vector combinations. A minimum chordal distance between any two pairs of vectors in the 64 vector combinations is identified. The 64×64 chordal distance matrix is constructed from the combination of vectors.

From the 64×64 chordal distance matrix, a minimum chordal distance value and its location in the matrix may be found. Based on the row and column index, two vectors having the minimum chordal distance may also be found. In a first step, one of these two vectors is eliminated. In a second step, to determine which one should be eliminated, sum the chordal distance values of each of the two vectors with all other vectors. The vector with the smaller sum chordal distance value will be eliminated. The first and second steps are repeated until the number of the remaining vectors equals a target number of vectors.

Thus, one or more of the illustrative embodiments provides a method and apparatus for transmitting data. In one illustrative embodiment, a device comprises a code book and a transmitter. The code book comprises a plurality of codewords corresponding to a plurality of vectors. The plurality of vectors has a largest minimum chordal distance with respect to the plurality of vectors. The transmitter is configured to send a number of wireless signals using the code book. Data is contained in the number of wireless signals.

In the depicted examples, simulation results provide a maximum value for the minimum chordal distance for a code book having 16 codewords as 0.866. A code book of 16 codewords is an example of one size for a rank 3 code book that may be used. Other sizes of code books may be used in different embodiments. With the threshold for the minimum chordal distance, a total of four sets of 16 vectors may be identified having a minimum chordal distance of 0.866. After the vectors are identified, the null space of the vectors is found in constructing a set to generate a code book.

Figure 5:
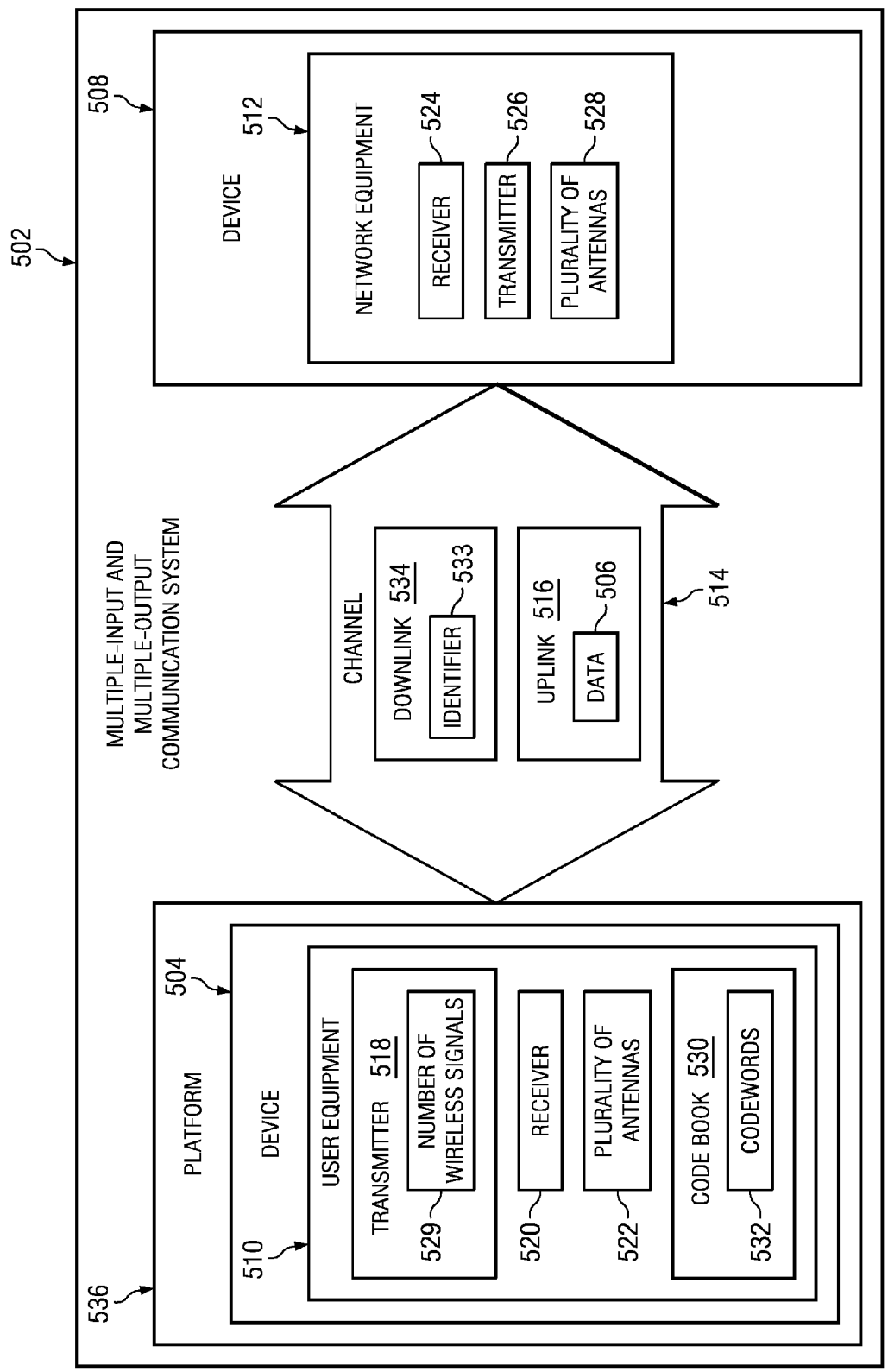
FIG. 5 is a block diagram illustrating a communication environment in accordance with an illustrative embodiment.

Turning now to FIG. 5, a block diagram illustrating a communication environment is depicted in accordance with an illustrative embodiment. In this illustrative example, multiple-input and multiple-output communication system 502 is an example of a communication system that may be implemented using hardware, such as the hardware illustrated in FIGS. 1-4.

As depicted, device 504 transmits data 506 to device 508. Device 504 may be, for example, without limitation, user equipment 510. User equipment 510 may be, for example, without limitation, a mobile phone, a wireless card, a laptop computer, or some other suitable device. Device 508 may be network equipment 512. Network equipment 512 may take a number of different forms such as, for example, a base station controller or other suitable equipment for receiving data 506.

In these illustrative examples, data 506 is transmitted from user equipment 510 to network equipment 512 using channel 514. More specifically, data 506 is transmitted in uplink 516 in channel 514. Data 506 may be, for example, without limitation, information, voice, programs, commands, other suitable types of data, or some combination thereof.

In uplink 516, a single-carrier frequency-division multiple access scheme may be used as a channel access method for channel 514. The channel access method allows user equipment to share a transmission medium. A single-carrier frequency-division multiple access scheme is a linearly pre-coded orthogonal frequency-division multiplexing scheme. One or more illustrative embodiments recognize that a single-carrier frequency-division multiple access scheme allocates multiple users one of several channels. Channel 514 may also be defined as a frequency band. One or more illustrative embodiments also recognize that a single-carrier frequency-division multiple access scheme maintains a lower peak to average peak ratio compared to orthogonal frequency-division multiplexing.

When transmitting signals for data 506 over channel 514, a different number of transmission layers may be used. The more transmission layers, the more capacity for data is available. In one or more illustrative embodiments, up to 4 transmission ranks are possible. In other illustrative embodiments, more or less transmission ranks may be used. The number of ranks corresponds to the number of transmission layers. For example, a rank of 3 corresponds to 3 transmission layers.

In these illustrative examples, user equipment 510 includes transmitter 518, receiver 520, and plurality of antennas 522. Network equipment 512 includes receiver 524, transmitter 526, and plurality of antennas 528. In these depicted examples, a transmitter may be any hardware device or component capable of transmitting information, such as number of wireless signals 529, using an antenna. A receiver may be any hardware or component capable of receiving information through the antennas. The receiver and transmitter also may include software, firmware, or a combination of the two.

In these illustrative examples, plurality of antennas 522 and plurality of antennas 528 each include four antennas. Of course, in other illustrative embodiments, other numbers of antennas may be used. For example, two antennas, six antennas, eight antennas, or some other suitable number of antennas may be used, depending on the particular implementation.

As depicted in this figure, user equipment 510 includes code book 530. Code book 530 contains codewords 532. Transmitter 518 uses codewords 532 to transmit data 506 from plurality of antennas 522 to plurality of antennas 528 in network equipment 512. The selection of a codeword from codewords 532 is used to transmit data 506. The use of codewords 532 may increase performance in the transmission of data 506 over channel 514. The performance may include a number of different parameters. The parameters may include, for example, without limitation, a bit error rate, bandwidth, transmission speed, gain, signal to noise ratio, quality of service, or any combination of these or other suitable parameters.

In these illustrative examples, network equipment 512 is configured to monitor the quality of channel 514 and may send identifier 533 a codeword within codewords 532 to user equipment 510 in downlink 534 in channel 514. Identifier 533 is used to identify a codeword within codewords 532 for use in transmitting data 506 to network equipment 512. In these examples, user equipment 510 transmits wireless signals using transmitter 518 and plurality of antennas 522 over channel 514 to plurality of antennas 528. Receiver 524 processes and decodes the wireless signals.

Additionally, in different embodiments, device 504 may be part of platform 536. Platform 536 may be a platform as selected from one of a mobile platform, a stationary platform, a land-based structure, an aquatic-based structure, a space-based structure, a smart phone, a personal digital assistant, a desktop computer, a server computer, a set-top box, a game console, a workstation, and any other suitable platform.

The illustration of multiple-input and multiple-output communication system 502 in FIG. 5 is not meant to imply physical or architectural limitations to the manner in which different illustrative embodiments may be implemented. Other components in addition to, or in place of, the ones illustrated may be used. Some components may be unnecessary in some illustrative embodiments. Also, the blocks are presented to illustrate some functional components. One or more of these blocks may be combined, divided, or combined and divided into different blocks when implemented in different illustrative embodiments.

For example, the different components illustrated in multiple-input and multiple-output communication system 502 may be applied to any communication system in which multiple streams of data are transmitted between devices. Also, multiple-input and multiple-output communication system 502 may include additional components not illustrated. For example, additional devices, such as base station controllers can be employed. In some illustrative embodiments, identifier 533 may not be used.

Figure 6:
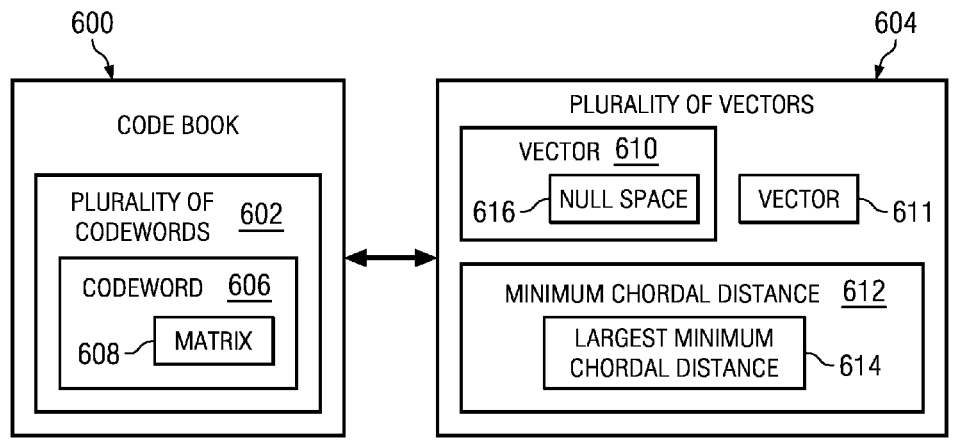
FIG. 6 is a block diagram of a code book in accordance with an illustrative embodiment.

Turning now to FIG. 6, a block diagram of a code book is depicted in accordance with an illustrative embodiment. In this example, code book 600 is an example of an implementation for code book 530 in FIG. 5. Code book 600 comprises plurality of codewords 602.

In these illustrative examples, plurality of codewords 602 are created using plurality of vectors 604. Each codeword in plurality of codewords 602 corresponds to a vector in plurality of vectors 604. For example, codeword 606 comprises matrix 608 and corresponds to vector 610.

Each pair of vectors in plurality of vectors 604 has minimum chordal distance 612. For example, vector 610 and vector 611 within plurality of vectors 604 has a chordal distance that is substantially equal to, or greater than, minimum chordal distance 612 for plurality of vectors 604. This relationship is present for every pair of vectors possible within plurality of vectors 604.

In these examples, minimum chordal distance 612 takes the form of largest minimum chordal distance 614. Largest minimum chordal distance 614 is the largest value possible for minimum chordal distance 612 for plurality of vectors 604.

Plurality of vectors 604 is used to create plurality of codewords 602 for code book 600. The illustrative embodiments recognize that using plurality of vectors 604 to generate code book 600 provides an ability to more efficiently generate code book 600. Further, by using plurality of vectors 604, code book 600 may provide better performance in transmitting data using wireless signals more efficiently as compared to currently available code books.

In these illustrative examples, plurality of vectors 604 is selected as having a desired minimum chordal distance, such as largest minimum chordal distance 614. Largest minimum chordal distance 614 may change, depending on the number of vectors present in plurality of vectors 604. For example, when plurality of codewords 602 comprises 16 codewords, plurality of vectors 604 also comprises 16 vectors. With 16 vectors, largest minimum chordal distance 614 may be selected to have a value greater than around 0.7071. In this particular example, the largest value for largest minimum chordal distance 614 may be at least around 0.8660 when 16 vectors are present. In other words, the chordal distance between each pair of vectors in plurality of vectors 604 is around at least 0.8660.

Plurality of vectors 604 is used to create matrices for plurality of codewords 602. For example, matrix 608 for codeword 606 is derived from null space 616 for a corresponding vector, such as vector 610 in plurality of vectors 604. The selection of vectors and the creation of codewords from the vectors are described in more detail below.

Figure 7:
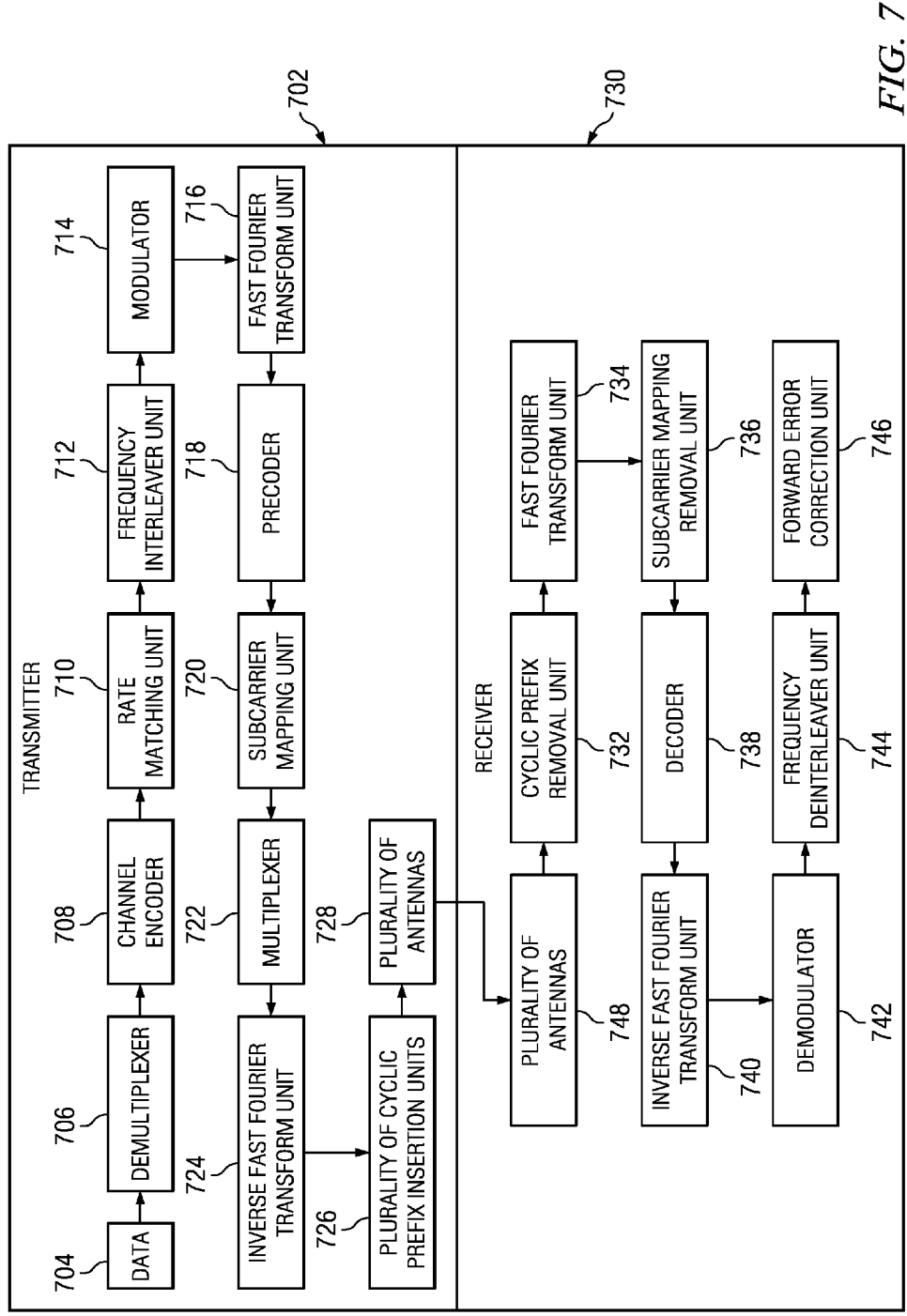
FIG. 7 is a diagram of a transmitter and receiver in accordance with an illustrative embodiment.

With reference to FIG. 7, a diagram of a transmitter and receiver is depicted in accordance with an illustrative embodiment. In these examples, transmitter 702 is an example of one implementation of transmitter 518 in FIG. 5, and receiver 730 is an example of an implementation of receiver 524 in FIG. 5.

In this illustrative example, transmitter 702 comprises data 704, demultiplexer 706, channel encoder 708, rate matching unit 710, frequency interleaver unit 712, modulator 714, fast Fourier transform unit 716, precoder 718, subcarrier mapping unit 720, multiplexer 722, inverse fast Fourier transform unit 724, plurality of cyclic prefix insertion units 726, and plurality of antennas 728.

Data 704 may be, for example, without limitation, information, a data stream, a plurality of data streams, and symbols. Transmitter 702 transmits wireless signals containing data 704 to receiver 730. Demultiplexer 706 may be any device which takes a single input signal from multiple channels and separates those over multiple output signals. Channel encoder 708 encodes bits of data 704. Encoding the data may also be referred to as forward error correction or error correction code. Encoding data 704 allows receiver 730 to identify errors in the transmission. Rate matching unit 710 repeats symbols in data 704 or removes symbols in data 704 to keep a desired rate. Frequency Interleaver unit 712 rearranges the symbols in data 704.

Modulator 714 varies the input data stream of data 704. In one illustrative embodiment, modulator 714 uses a quadrature phase shift keying (QPSK) scheme. QPSK varies the input data stream by changing the phase. QPSK uses 4 phases and is also known as 4 PSK. QPSK encodes 2 bits per symbol resulting in 4 symbols. In other illustrative embodiments, binary PSK, 8 PSK, 16 quadrature amplitude modulation (QAM), 64 QAM, or other modulation schemes may be used.

Fast Fourier transform unit 716 computes the discrete Fourier transform. The discrete Fourier transform applied to data 704 converts data 704 into the frequency domain.

Precoder 718 uses a codeword from a code book, such as code book 530 in FIG. 5, to precode data 704. Precoding adjusts data 704 to indicate a direction for the output signal of transmitter 702. The direction is a combination of phase and amplitude.

Subcarrier mapping unit 720 maps the output of data 704 onto the entire bandwidth span. In one illustrative embodiment, the entire bandwidth span may be up to 20 MHz.

Multiplexer 722 combines multiple streams of data 704 into a single stream. Inverse fast Fourier transform unit 724 converts data 704 into the time domain. Plurality of cyclic prefix insertion units 726 takes the output from inverse fast Fourier transform unit 724 and repeats the end of the signal at the beginning. Plurality of antennas 728 converts the signal, an electrical current, and produces electromagnetic waves.

In this illustrative example, receiver 730 comprises plurality of antennas 748, cyclic prefix removal unit 732, fast Fourier transform unit 734, subcarrier mapping removal unit 736, decoder 738, inverse fast Fourier transform unit 740, demodulator 742, frequency deinterleaver unit 744, and forward error correction unit 746. Receiver 730 processes a signal in the form of electromagnetic waves received from transmitter 702.

Plurality of antennas 748 receives a signal transmitted by transmitter 702. Cyclic prefix removal unit 732 removes the cyclic prefix from data 704 received by plurality of antennas 748. Fast Fourier transform unit 734 converts data 704 into the frequency domain. Subcarrier mapping removal unit 736 reverses the subcarrier mapping performed by subcarrier mapping unit 720. Decoder 738 reverses the precoding applied to data 704. Inverse fast Fourier transform unit 740 processes data 704 into the time domain. Demodulator 742 reverses the modulation of modulator 714. Demodulator 742 uses the same scheme of modulation as modulator 714. Frequency deinterleaver unit 744 deinterleaves data 704 by reorganizing the symbols in data 704 to the original positions. Forward error correction unit 746 detects errors in data 704.

The illustration of the transmitter and receiver in FIG. 7 is not meant to imply physical or architectural limitations to the manner in which different illustrative embodiments may be implemented. Other components in addition to, or in place of, the ones illustrated may be used. Some components may be unnecessary in some illustrative embodiments. Also, the blocks are presented to depict some functional components. One or more of these blocks may be combined, divided, or combined and divided into different blocks when implemented in different illustrative embodiments.

For example, forward error correction unit 746 may be placed closest to plurality of antennas 748 in receiver 730. Additionally, some of the components may not be used in the transmitting and receiving of data 704. For example, plurality of cyclic prefix insertion units 726 and cyclic prefix removal unit 732 may not be used at all. Other components may be added or removed for different embodiments of transmitting and receiving data.

Figure 8:
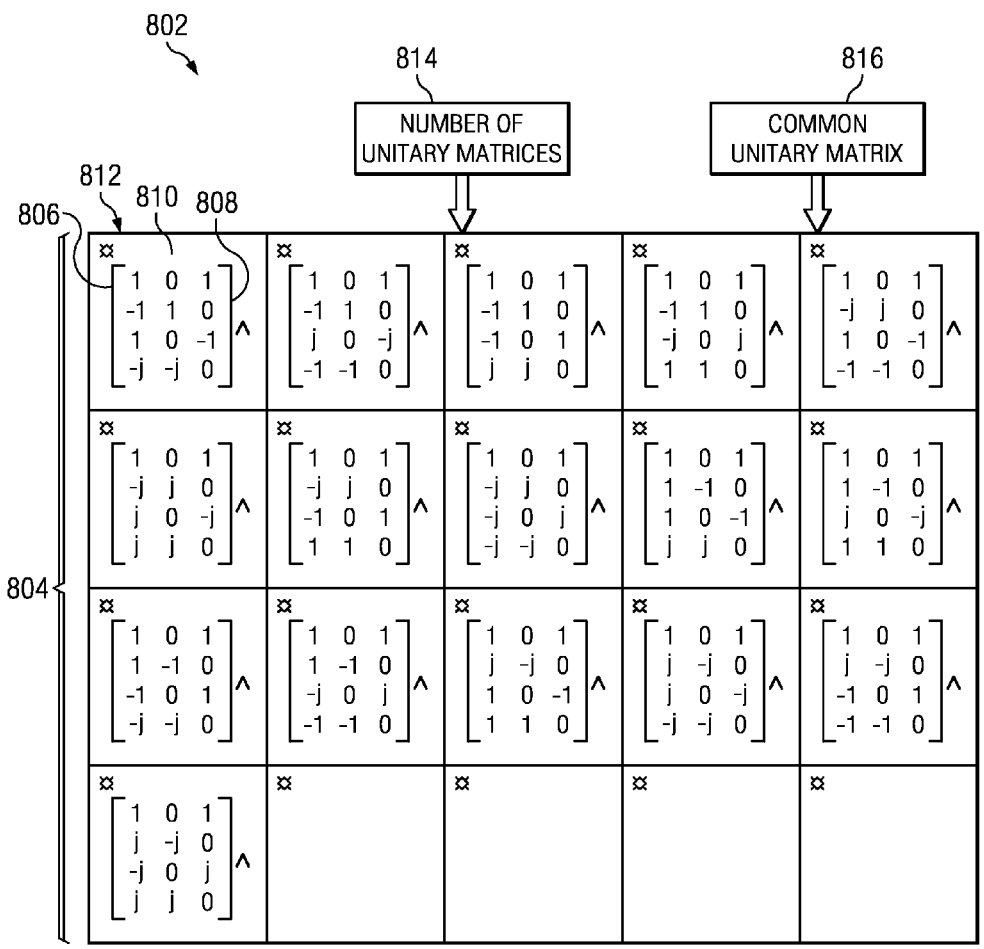
FIG. 8 is a diagram of a code book in accordance with an illustrative embodiment.

With reference to FIG. 8, a diagram of a code book is depicted in accordance with an illustrative embodiment. In this example, code book 802 is one example of one implementation of a code book such as, for example, code book 530 in FIG. 5.

In this illustrative example, code book 802 comprises plurality of codewords 804. Each codeword of plurality of codewords 804 corresponds to a 4×3 matrix. In this illustrative embodiment, code book 802 is a code book for a transmission rank of 3. The columns of the rank 3 plurality of codewords 804 and the vector from which the rank 3 codewords correspond are orthogonal to each other.

If each codeword of plurality of codewords 804 is multiplied from the left side 806 or right side 808 by number of unitary matrices 814, another codeword is formed. An illustration of the codeword matrix multiplied by the unitary matrices is as follows:

$$\begin{bmatrix} 1 \\ a \\ b \\ c \end{bmatrix} \Rightarrow V \begin{bmatrix} 1 & 0 & 1 \\ -a & a & 0 \\ b & 0 & -b \\ -c & -c & 0 \end{bmatrix} \Lambda U$$

U and V are unitary matrices. As an example of unitary matrices, when multiplying the codeword matrix by unitary matrices, such as number of unitary matrices 814, the results are 24 row permutation matrices for V and 384 column permutation matrices for U using the elements of the alphabet of $\{1, -1, j, -j\}$. Each permutation has the same minimum chordal distance properties.

For example, in one or more embodiments, seed codeword 812 may be codeword 810. In different embodiments, at least one of the plurality of codewords may be generated by multiplying seed codeword 812 with each one of number of unitary matrices 814 from right hand side 808 of the seed codeword 812. In another embodiment, each of the plurality of codewords is generated by multiplying seed codeword 812 with common unitary matrix 816 from a left hand side 806 of the seed codeword 812.

In yet another embodiment, each of the plurality of codewords is generated by multiplying seed codeword 810 with common unitary matrix 816 from a left hand side 806 of the seed codeword 812 and each one of number of unitary matrices 814 from right hand side 808 of seed codeword 812 for each one of plurality of codewords 810. Common unitary matrix 816 may be a matrix that is multiplied with seed codeword 812 to form each of the plurality of codewords. In contrast, right hand side 808 of seed codeword 812 may be multiplied with different matrices of number of unitary matrices 814 to form each of the plurality of codewords.

With reference to FIG. 9, a diagram of a set of vectors is depicted in accordance with an illustrative embodiment. In these depicted examples, set of vectors 902 are one example of one implementation of a plurality of vectors such as, for example, plurality of vectors 604 as shown in FIG. 6.

Figure 10:
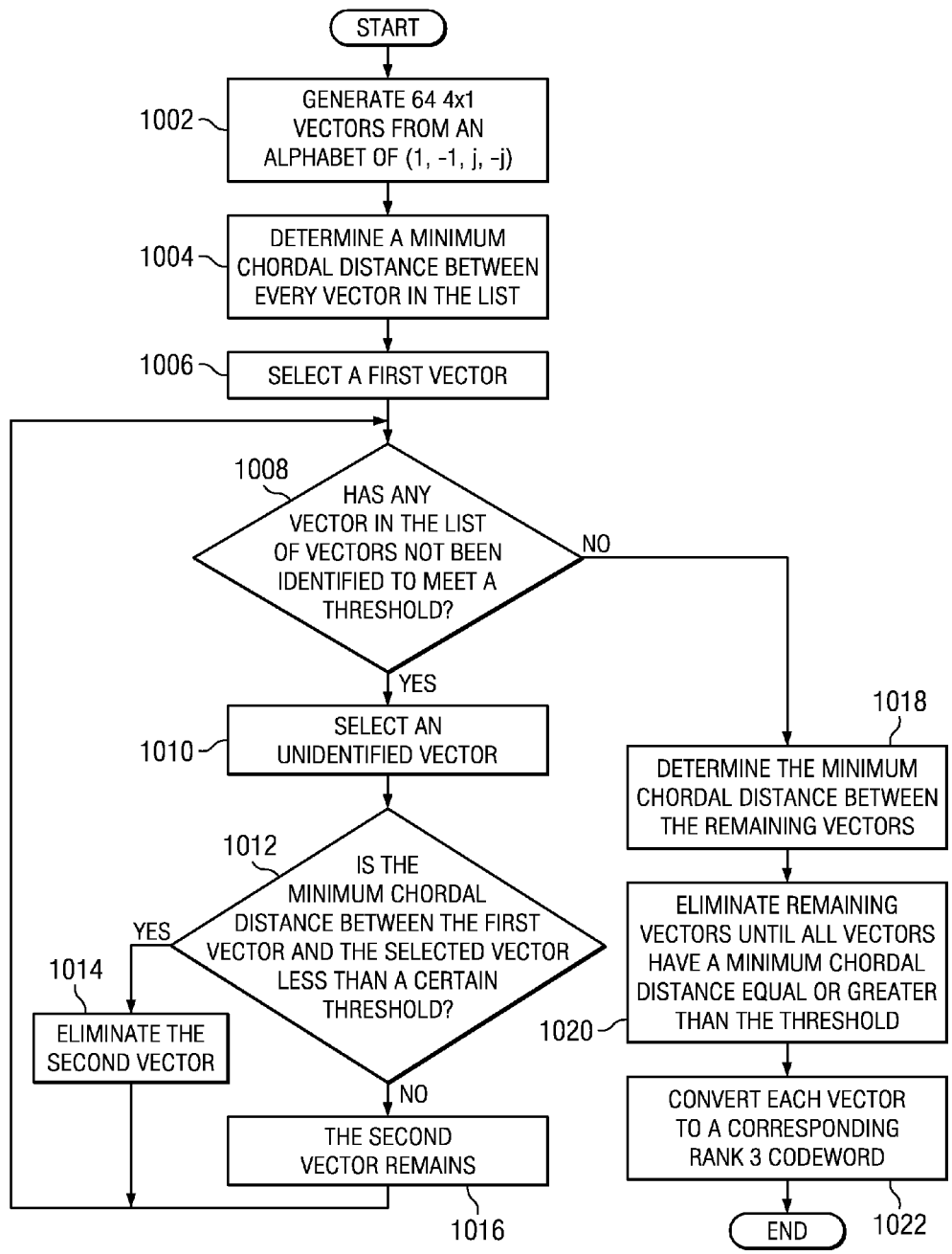
FIG. 10 is a flowchart of a process for creating a code book in accordance with an illustrative embodiment.

With reference to FIG. 10, a flowchart of a process for creating a code book is depicted in accordance with an illustrative embodiment. The process in FIG. 10 is an example of one process for creating a code book. In other embodiments, other processes may be used. For example, without limitation, the process in FIG. 11 below may be used. Referring to FIG. 10, the process begins by generating 64 4×1 vectors from an alphabet of $\{1, -1, j, -j\}$ to form a vector list (step 1002). The first element of the 4×1 vector is the constant "1". The remaining three elements are chosen from the alphabet. For example, one of such vectors may be $[1, j, j, -1]$. Once the vector list is generated, the process determines a minimum chordal distance between every vector in the list (step 1004). In the illustrative examples, the following formula is used to determine the minimum chordal distance between two unit length vectors u and v:

$$d_C(u, v) = \sqrt{1 - |u^H \cdot v|^2}.$$

In the formula, $d_C$ is the chordal distance between u and v. The representation $|u^H \cdot v|^2$ is the square of the inner product between u and v.

Next, the process selects a first vector (step 1006). The process then determines whether the minimum chordal distance of any vector in the list of vectors has not been identified to meet a threshold (step 1008). If the minimum chordal distance of any vector in the list of vectors has not been identified to meet a threshold, then the process selects an unidentified vector (step 1010).

The process then determines whether the minimum chordal distance between the first vector and the selected vector is less than a certain threshold (step 1012). If the minimum chordal distance is less than the threshold, the process eliminates the second vector (step 1014). In one or more embodiments, the threshold has a value of 0.866. With a threshold of 0.866, 16 vectors are selected. The 16 vectors that are selected with a threshold of 0.866 are the vectors in FIG. 9. In other embodiments, the value of the threshold may be a different value and may result in a different set of vectors.

If the minimum chordal distance is greater than the threshold, the second vector remains in the set (step 1016). The process then returns to step 1008 as described above. This loop is repeated until all vectors have been identified to form a set of vectors.

With reference again to step 1008, if all vectors have been identified to meet the threshold, then the process determines whether the minimum chordal distance between each of the remaining vectors is greater than the threshold (step 1018). For every vector that does not meet the threshold, the process removes the vector from the set of vectors until all remaining vectors in the set of vectors have a minimum chordal distance equal or greater than the threshold (step 1020).

In other embodiments, the last element of the set of vectors may be multiplied by each one of the values $\{-1, j, -j\}$ separately to form three other sets of vectors for a total of four sets of vectors. Each of the four sets of vectors has the same chordal distance properties. Finally, the process converts each vector to a corresponding rank 3 codeword (step 1022), with the process terminating thereafter. The process converts the vectors by inputting the vector elements as follows:

$$\text{Matrix Formula 1} \rightarrow \begin{bmatrix} 1 \\ a \\ b \\ c \end{bmatrix} \Rightarrow \begin{bmatrix} 1 & 0 & 1 \\ -a & a & 0 \\ b & 0 & -b \\ -c & -c & 0 \end{bmatrix} \Lambda$$

Inputting the vector elements into Matrix Formula 1 results in a rank 3 codeword corresponding to the null space of the vector. The columns of the Matrix Formula 1 are orthonormal to each other and the vector. In a different embodiment, a normalization matrix Lamda ($\Lambda$) may be used to adjust the power between the layers. An illustrative example in which the columns have unit norm gives Lamda as the following matrix:

$$\Lambda = \frac{1}{\sqrt{2}} \begin{bmatrix} 1/\sqrt{2} & 0 & 0 \\ 0 & 1 & 0 \\ 0 & 0 & 1 \end{bmatrix}$$

For example, the rank 3 codeword corresponding to the null space of $[1, 1, 1, j]^T$ will be the following:

$$\begin{bmatrix} 1 & 0 & 1 \\ -1 & 1 & 0 \\ 1 & 0 & -1 \\ -j & -j & 0 \end{bmatrix} \Lambda$$

Matrix Formula 1 allows the selection of a matrix which has columns orthogonal to each other and the vector. Additionally, Matrix Formula 1 is Cubic Metric Friendly because of having a zero element in each row, no zero elements in the first column, 2 zero elements in the second column and 2 zero elements in the third column. In other embodiments, there may be other ways to make the codewords Cubic Metric Friendly using a different combination or number of zeros.

In these examples, cubic metric is the metric of the actual reduction in power capability, or power de-rating, of a typical power amplifier, for example, user equipment 510 in FIG. 5. During uplink 516 in FIG. 5, if PAPR reaches its peak there is non-linear distortion in the amplifier. One or more illustrative embodiments recognize that it is desired for peak power to not get high enough for the amplifier to operate in a non-linear region. The closer peak power is to the average of the power, the less saturation exists in the amplifier. Cubic Metric may be calculated using the following formula:

$$CM = \frac{20\log_{10}\{\text{rms}[v_{norm}^3(t)]\} - 1.52}{1.56} + 0.77 \text{ dB},$$

In the above formula, CM represents Cubic Metric and rms represents root mean square. In the above formula, 0.77 dB is selected to represent the increase in Cubic Metric due to the change in signal bandwidth relative to 3.84 MHz. However, other embodiments may use a different dB with a different frequency.

An identity matrix preserves cubic metric. When less zeros are present in the matrix, the more cubic metric increases. In these illustrative examples, a code book is Cubic Metric Preserving (CMP) when the cubic metric does not change after the multiplication of each of the codewords. Alternatively, Cubic Metric could be kept friendly. A code book is said to be Cubic Metric Friendly (CMF) when the increase of the cubic metric after multiplication of the codewords are not significant.

Although the depicted example in FIG. 10 is directed to 64 4×1 vectors. Other numbers and sizes of vectors may be used in different embodiments. For example, in other embodiments, 32 or 128 vectors may be used.

Figure 11:
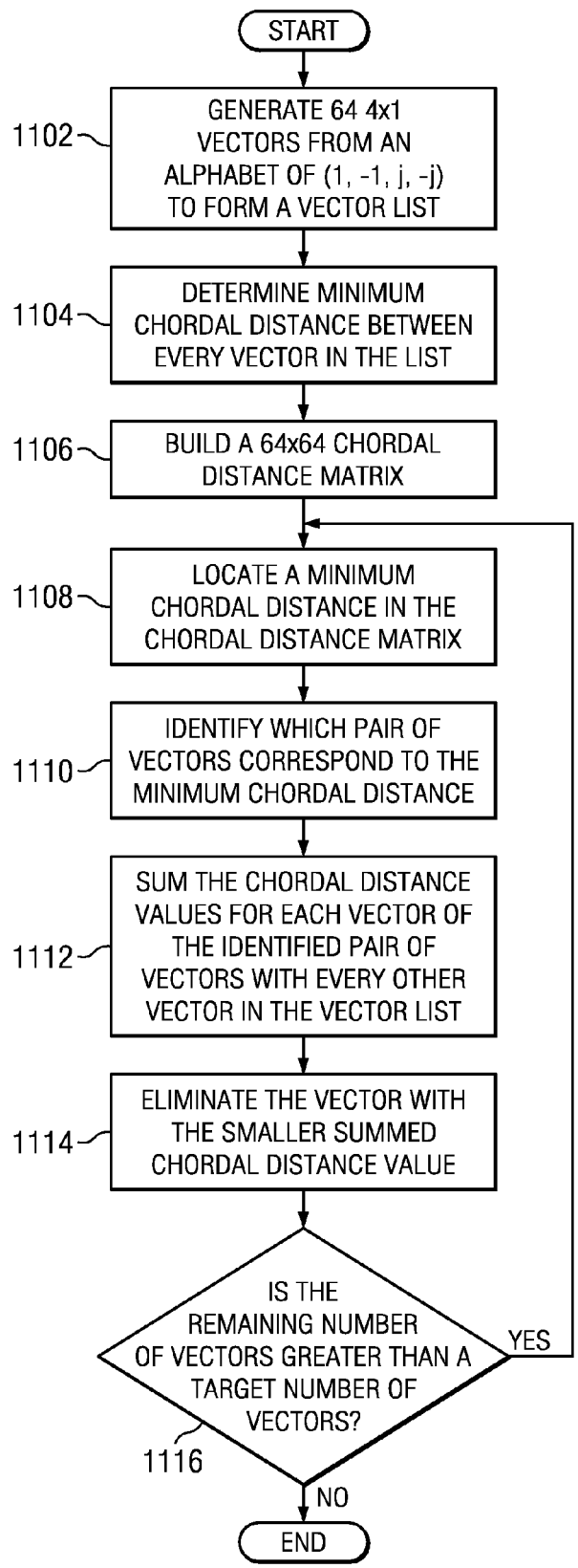
FIG. 11 is a flowchart of a process for creating a code book in accordance with an illustrative embodiment.

With reference now to FIG. 11, a flowchart of a process for creating a code book is depicted in accordance with an illustrative embodiment. This process may be used to create a code book, such as, for example, code book 530 in FIG. 5.

This process may be implemented by a computer implemented process in which the different illustrated steps may take the form of program code in a functional form on a storage device for execution by a processor unit. The storage device may be, for example, a random access memory, a hard disk drive, a flash drive, a solid state disk drive, or some other suitable storage device. The processor unit may be a number of processors.

The process begins by generating 64 4×1 vectors from an alphabet of $\{1, -1, j, -j\}$ to form a vector list (step 1102). The first element of the 4×1 vector is the constant "1". The remaining three elements are chosen from the alphabet. For example, one of such vectors may be $[1, j, j, -1]$. Once the vector list is generated, the process determines a minimum chordal distance between every vector in the list (step 1104).

Next, the process builds a 64×64 chordal distance matrix (step 1106). The chordal distance matrix will contain the chordal distance for every possible pair of the 64 vectors in the vector list. The process locates a minimum chordal distance in the chordal distance matrix (step 1108). In a set of 64 vectors with elements chosen from the alphabet of $\{1, -1, j, -j\}$, one or more embodiments recognize that the chordal distance between any pair of vectors falls within the set $\{0.6124, 0.7071, 0.866, 0.9354, 1\}$. Thereafter, the process identifies which pair of vectors correspond to the minimum chordal distance (step 1110). In one embodiment, the minimum chordal distance will be 0.6124.

The process sums the chordal distance values for each vector of the identified pair of vectors with every other vector in the vector list (step 1112). The process eliminates the vector with the smaller summed chordal distance value (step 1114). A determination is made as to whether the remaining number of vectors is greater than a target number of vectors (step 1116). If the remaining number of vectors is greater than the target number of vectors, the process returns to step 1108 as described above to repeat steps 1108 through 1114 to eliminate another vector. With reference again to step 1116, if the remaining number of vectors is equal to the target number of vectors, the process terminates.

One or more embodiments recognize that for the target number of vectors, with elements chosen from the alphabet of $\{1, -1, j, -j\}$, equal to 16, the greatest minimum chordal distance is 0.866. One set of 16 vectors that is selected with a minimum chordal distance value of 0.866 are the vectors in FIG. 9. In total, there are 4 sets of vectors with a target number of vectors of 16, with the minimum chordal distance equal to 0.866. In other embodiments, the minimum chordal distance value may be a different value, depending on the number of vectors. For example, choosing a minimum chordal distance of 0.6124 will result in a set of vectors of 64, 0.7071 will result in a set of vectors of 32, and 1 will result in a set of vectors of 4.

Figure 12:
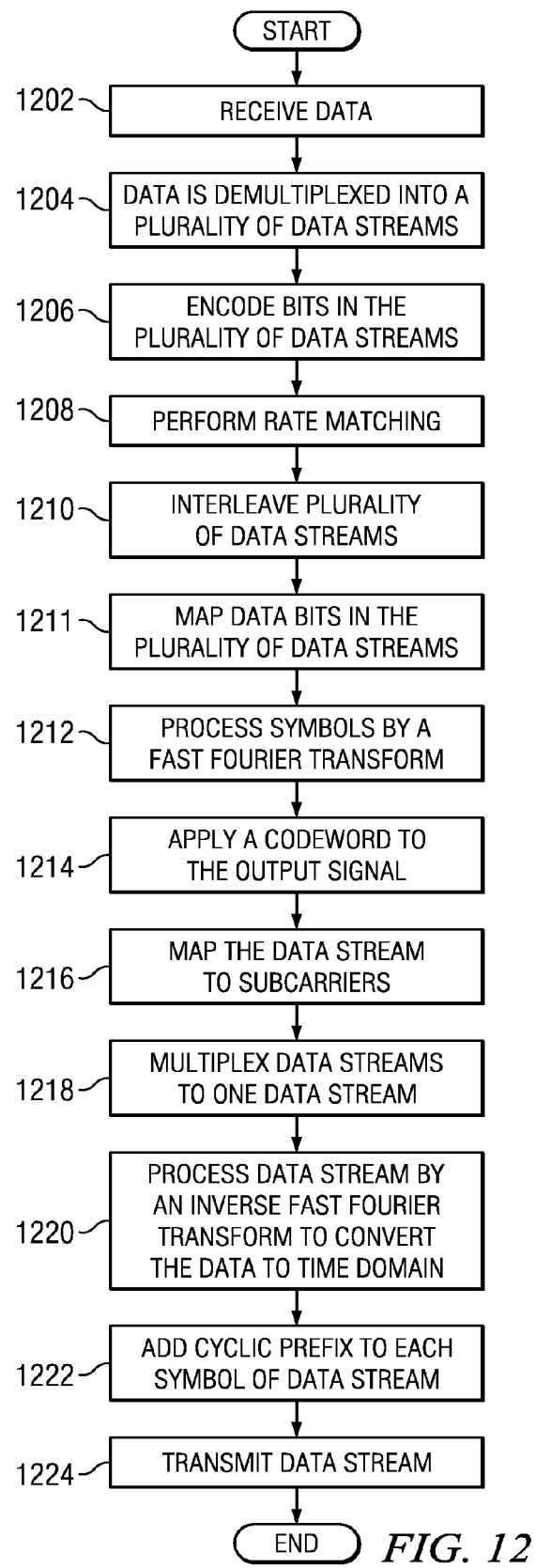
FIG. 12 is a flowchart of a process for transmitting a signal from user equipment in accordance with an illustrative embodiment.

With reference to FIG. 12, a flowchart of a process for transmitting a signal from user equipment is depicted in accordance with an illustrative embodiment. The process may be implemented in a device, such as transmitter 518 in FIG. 5.

The process begins by receiving data (step 1202). A demultiplexer demultiplexes the data into a plurality of data streams (step 1204). Once the data is demultiplexed, a channel encoder encodes bits in the plurality of data streams (step 1206). After the plurality of data streams is encoded, a rate matching unit performs rate matching (step 1208). Then, a frequency interleaver unit interleaves the plurality of data streams (step 1210). After interleaving, a modulator maps data bits in the plurality of data streams (step 1211). In one illustrative embodiment, the modulator uses a quadrature phase shift keying (QPSK) modulation scheme. After modulation, a fast Fourier transform processes the symbols (step 1212). The result of processing by the fast Fourier transform is an output signal in the frequency domain.

A precoder then takes the output signal and applies a codeword (step 1214). The codeword may be selected from code book 530 in FIG. 5. In other illustrative embodiments, the codeword may be selected from a different code book. Once the data stream is altered by precoding, a subcarrier mapping unit maps the data streams to subcarriers assigned to the user equipment (step 1216). A multiplexer then multiplexes the data streams into one data stream (step 1218). An inverse fast Fourier transform processes the data stream to convert the data to the time domain (step 1220). Then, a plurality of cyclic prefix units add a cyclic prefix to each symbol of the data stream (step 1222). Finally, a plurality of antennas transmit the data stream (step 1224) with the process terminating thereafter.

In reference to FIG. 13, a flowchart of a process for receiving a signal from user equipment is depicted in accordance with an illustrative embodiment. The process may be implemented in a device, such as receiver 524 in FIG. 5.

The process begins by a plurality of antennas receiving data (step 1302). Then, a cyclic prefix removal unit removes a cyclic prefix from the data (step 1304). A fast Fourier transform converts the data to the frequency domain (step 1306). Then, a subcarrier demapping unit removes the subcarrier channels (step 1308). After the subcarrier channels are removed, a decoder removes the codeword from the data (step 1310). An inverse fast Fourier transform processes the data to convert the data back into the time domain (step 1312). A demodulator converts the time domain data into bit streams (step 1314). Deinterleavers then deinterleave the data (step 1316). The forward error correction unit processes the data (step 1318) with the process terminating thereafter. The data is then ready for use by other components or devices.

The flowcharts and block diagrams in the different depicted embodiments illustrate the architecture, functionality, and operation of some possible implementations of apparatus and methods in different illustrative embodiments. In this regard, each block in the flowchart or block diagrams may represent a module, segment, function, or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The description of the different illustrative embodiments has been presented for purposes of illustration and description, and is not intended to be exhaustive or limited to the embodiments in the form disclosed. Many modifications and variations will be apparent to those of ordinary skill in the art. In the illustrative examples, the user equipment has been described with respect to a mobile phone, a wireless card, and a laptop computer. The different illustrative embodiments may be applied to other types of platforms in addition to, or in place of, the ones described.

For example, the code book and the transmitter may be located in a platform as selected from one of a mobile platform, a stationary platform, a land-based structure, an aquatic-based structure, a space-based structure, a smart phone, a personal digital assistant, a desktop computer, a server computer, a set-top box, a game console, a workstation, and any other suitable platform. A component may be included in a platform in a number of different ways. For example, the component may be located inside the platform, outside of the platform, formed as part of the platform, mechanically secured to the platform, or otherwise associated with the platform.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A device comprising:
a code book comprising a plurality of codewords, wherein the plurality of codewords correspond to a plurality of vectors having a largest minimum chordal distance with respect to the plurality of vectors; and
a transmitter configured to send a number of wireless signals using the code book,
wherein each of the plurality of codewords comprises a matrix, the matrix comprising multiple rows and multiple columns, and at least one column has a zero and at least one other column has no zeroes.

2. The device of claim 1, wherein the plurality of codewords comprises 16 codewords and the plurality of vectors comprises 16 vectors.

3. The device of claim 1, wherein the largest minimum chordal distance with respect to the plurality of vectors has a value of greater than around 0.7071.

4. The device of claim 1, wherein the largest minimum chordal distance with respect to the plurality of vectors has a value of at least around 0.8660.

5. The device of claim 1, further comprising:
a plurality of antennas, wherein the transmitter is configured to transmit the number of wireless signals from the plurality of antennas using the code book.

6. The device of claim 1, wherein the matrix comprises three columns and four rows in which zero values are absent in one of the three columns.

7. The device of claim 1, wherein at least one of the plurality of codewords is generated by multiplying a seed codeword with a unitary matrix from a right hand side of the seed codeword.

8. The device of claim 1, wherein at least one of the plurality of codewords is generated by multiplying a seed codeword with a unitary matrix from a left hand side of the seed codeword.

9. The device of claim 1, wherein each of the plurality of codewords is generated by multiplying a seed codeword with a common unitary matrix from a left hand side of the seed codeword.

10. The device of claim 1, wherein the plurality of codewords comprises 16 codewords and the plurality of vectors comprises 16 vectors, the largest minimum chordal distance with respect to the plurality of vectors have a value of at least 0.8660, the matrix comprises three columns and four rows, a zero is present in each row of the matrix, and zero values are absent in one of the three columns and two zeros are present in each remaining column in the matrix.

11. The device of claim 1 further comprising:
a platform, wherein the code book and the transmitter are included in the platform.

12. The device of claim 11, wherein the platform is selected from one of a mobile platform, a stationary platform, a land-based structure, an aquatic-based structure, a space-based structure, a mobile phone, a smart phone, a laptop computer, a personal digital assistant, a desktop computer, a server computer, a set-top box, a wireless card, a game console, and a work station.

13. A method for transmitting information, the method comprising:

identifying a codeword in a code book comprising a plurality of codewords generated using a plurality of vectors having a largest minimum chordal distance with respect to the plurality of vectors; and transmitting a number of wireless signals from a device using a transmitter and the codeword, wherein each of the plurality of codewords comprises a matrix having three columns and four rows in which zero values are absent in one of the three columns and at least one other column has a zero value.

14. The method of claim 13, wherein the plurality of codewords comprises 16 codewords and the plurality of vectors comprises 16 vectors.

15. The method of claim 13, wherein the largest minimum chordal distance with respect to the plurality of vectors has a value of greater than around 0.7071.

16. The method of claim 13, wherein the largest minimum chordal distance with respect to the plurality of vectors has a value of at least around 0.8660.

17. The method of claim 13, in which a zero is present in each row of the matrix.

18. The method of claim 13, wherein two zeros are present in each remaining column in the matrix.

19. A device comprising:

a plurality of antennas; and a receiver coupled to the plurality of antennas, wherein the receiver is configured to receive a number of wireless signals in which the number of wireless signals are transmitted by a transmitter using a code book comprising a plurality of codewords, wherein the plurality of codewords correspond to a plurality of vectors having a largest minimum chordal distance with respect to the plurality of vectors, wherein each of the plurality of codewords comprises a matrix, the matrix comprises multiple columns in which zero values are absent in at least one column and one or more zeros are present in at least one other column.

20. The device of claim 19, wherein the plurality of codewords comprises 16 codewords and the plurality of vectors comprises 16 vectors.

21. The device of claim 19, wherein the largest minimum chordal distance with respect to the plurality of vectors have a value of greater than around 0.7071.

22. The device of claim 19, wherein the largest minimum chordal distance with respect to the plurality of vectors have a value of at least around 0.8660.

23. The device of claim 19, wherein the matrix comprises three columns and four rows in which zero values are absent in one of the three columns and two zeros are present in each remaining column in the matrix.

24. The device of claim 19, wherein at least one of the plurality of codewords is generated by multiplying a seed codeword with a unitary matrix from a right hand side of the seed codeword.

25. The device of claim 19, wherein at least one of the plurality of codewords is generated by multiplying a seed codeword with a unitary matrix from a left hand side of the seed codeword.

26. The device of claim 19, wherein each of the plurality of codewords is generated by multiplying a seed codeword with a common unitary matrix from a left hand side of the seed codeword.

27. A method for receiving information, the method comprising:

receiving a number of wireless signals from a device, wherein the number of wireless signals are transmitted using a code book comprising a plurality of codewords generated using a plurality of vectors having a largest minimum chordal distance with respect to the plurality of vectors, wherein each of the plurality of codewords comprises a matrix having three columns and four rows in which zero values are absent in one of the three columns and one or more zeros are present in at least one column.

28. The method of claim 27, wherein the plurality of codewords comprises 16 codewords and the plurality of vectors comprises 16 vectors.

29. The method of claim 27, wherein the largest minimum chordal distance with respect to the plurality of vectors has a value of greater than around 0.7071.

30. The method of claim 27, wherein the largest minimum chordal distance with respect to the plurality of vectors has a value of at least around 0.8660.

* * * * *

UNITED STATES PATENT AND TRADEMARK OFFICE
CERTIFICATE OF CORRECTION

PATENT NO. : 8,594,220 B2
APPLICATION NO. : 12/702365
DATED : November 26, 2013
INVENTOR(S) : Alireza Bayesteh et al.

Page 1 of 1

It is certified that error appears in the above-identified patent and that said Letters Patent is hereby corrected as shown below:

Title Page 2, Col. 1, line 7 is shown in the Patent with a typographical error.

"(San Fransicso, USA, May 4-8, 2009), pp. 1-70" should read "(San Francisco, USA, May 4-8, 2009), pp. 1-70"

Signed and Sealed this
Eighth Day of July, 2014

Michelle K. Lee
*Deputy Director of the United States Patent and Trademark Office*